(12) United States Patent
Chen

(10) Patent No.: US 9,022,472 B2
(45) Date of Patent: May 5, 2015

(54) CHILD SAFETY SEAT

(71) Applicant: BP Children's Products HK Co., Limited, Kowloon (HK)

(72) Inventor: Ying-Zhong Chen, Kowloon (HK)

(73) Assignee: BP Children's Products HK Co., Ltd., Hong Kong (HK)

( * ) Notice: Subject to any disclaimer, the term of this patent is extended or adjusted under 35 U.S.C. 154(b) by 0 days.

(21) Appl. No.: 13/942,746

(22) Filed: Jul. 16, 2013

(65) Prior Publication Data

US 2014/0021758 A1   Jan. 23, 2014

(30) Foreign Application Priority Data

Jul. 18, 2012   (CN) .......................... 2012 1 0250252

(51) Int. Cl.
*B60N 2/26* (2006.01)
*B60N 2/28* (2006.01)

(52) U.S. Cl.
CPC ................ *B60N 2/26* (2013.01); *B60N 2/2851* (2013.01)

(58) Field of Classification Search
USPC ....................................................... 297/250.1
See application file for complete search history.

(56) References Cited

U.S. PATENT DOCUMENTS

| | | | |
|---|---|---|---|
| 6,623,074 B2 | 9/2003 | Asbach et al. | |
| 7,055,903 B2* | 6/2006 | Balensiefer et al. | ... 297/250.1 X |
| 7,066,536 B2* | 6/2006 | Williams et al. | ........... 297/250.1 |
| 7,278,683 B2* | 10/2007 | Williams et al. | ........... 297/250.1 |
| 7,370,912 B2* | 5/2008 | Williams et al. | ....... 297/250.1 X |
| 8,632,127 B2* | 1/2014 | Brunick et al. | ............ 297/250.1 |
| 8,801,096 B2* | 8/2014 | Brunick et al. | ............ 297/250.1 |
| 2004/0070244 A1* | 4/2004 | Williams et al. | ........... 297/250.1 |
| 2005/0225136 A1* | 10/2005 | Horton et al. | .............. 297/250.1 |
| 2006/0001300 A1 | 1/2006 | Harcourt et al. | |
| 2011/0309663 A1* | 12/2011 | Brunick et al. | ............ 297/250.1 |
| 2012/0313413 A1* | 12/2012 | Hutchinson et al. | ....... 297/250.1 |
| 2014/0132049 A1* | 5/2014 | Brunick et al. | ............ 297/250.1 |

FOREIGN PATENT DOCUMENTS

| | | |
|---|---|---|
| CN | 201597477 U | 10/2010 |
| CN | 201736846 U | 2/2011 |
| CN | 201761387 U | 3/2011 |
| EP | 2272709 A2 | 12/2011 |
| GB | 2491456 A | 12/2012 |
| GB | 2491708 A | 12/2012 |

* cited by examiner

*Primary Examiner* — Rodney B White
(74) *Attorney, Agent, or Firm* — David I. Roche; Baker & McKenzie LLP

(57) ABSTRACT

A child safety seat includes a seat shell including a backrest that has a lengthwise axis, a headrest assembled with the seat shell and movable along the lengthwise axis of the backrest, and a headrest adjustment mechanism. The headrest adjustment mechanism includes two tube segments affixed with the backrest, a mount frame affixed with the headrest, two latches and a driving part. The mount frame is movable with the headrest along the tube segments. The two latches are assembled with the mount frame, wherein the latches are operable to move transversally relative to the headrest to respectively engage with the two tube segments to lock the headrest in position, and to respectively disengage from the tube segments to allow adjustment of the headrest. The driving part is connected with the two latches, and is movable along the lengthwise axis to cause the latches to respectively disengage from the tube segments.

14 Claims, 9 Drawing Sheets

CHILD SAFETY SEAT

CROSS-REFERENCE TO RELATED APPLICATION

This application claims priority to Chinese Patent Application No. 201210250252.0 filed on Jul. 18, 2012, which is incorporated herein by reference.

BACKGROUND

1. Field of the Invention

The present invention relate to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The child safety seat can be fixedly installed in on the passenger's seat of the vehicle, and has an embedded restraint harness more adapted to provide protection for the young child.

In order to accommodate children of different sizes, the child safety seat may have a headrest that is adjustable in height. China Utility Model No. 201597477 discloses a child safety seat including a headrest movably assembled with the backrest of the seat. The headrest adjustment mechanism as disclosed in this reference includes a shaft, an operating member affixed with the locking shaft, and a plurality of racks including a plurality of locking grooves. The operating member and the locking shaft are assembled with the headrest, and the racks are affixed with the backrest. The shaft can engage with the racks to lock the headrest in position, and the operating member can be operable to disengage the shaft from the racks so that the headrest can be adjustable relative to the backrest. One disadvantage of the structure described in the aforementioned reference is that a child sitting on the child safety seat may directly touch the operating member, causing accidental unlocking of the headrest. Moreover, the shaft and the racks exposed outward at the rear of the backrest may undesirably contact with a surrounding environment, which may interfere with the operation of the headrest adjustment mechanism.

Therefore, there is a need for a child safety seat that is safer in use, and can address at least the foregoing issues.

SUMMARY

The present application describes a child safety seat that is relatively simple in construction, easy to operate and more reliable in use. In some embodiments, the child safety seat includes a seat shell including a backrest that has a lengthwise axis, a headrest assembled with the seat shell and movable along the lengthwise axis of the backrest, and a headrest adjustment mechanism. The headrest adjustment mechanism includes two tube segments, a mount frame, two latches and a driving part. The two tube segments are affixed with the backrest. The mount frame is affixed with the headrest, and is movable with the headrest along the tube segments. The two latches are assembled with the mount frame, wherein the latches are operable to move transversally relative to the headrest to respectively engage with the two tube segments to lock the headrest in position, and to respectively disengage from the tube segments to allow adjustment of the headrest. The driving part is connected with the two latches, wherein the driving part is movable along the lengthwise axis to cause the latches to respectively disengage from the tube segments.

DETAILED DESCRIPTION OF THE EMBODIMENTS

Figure 1:
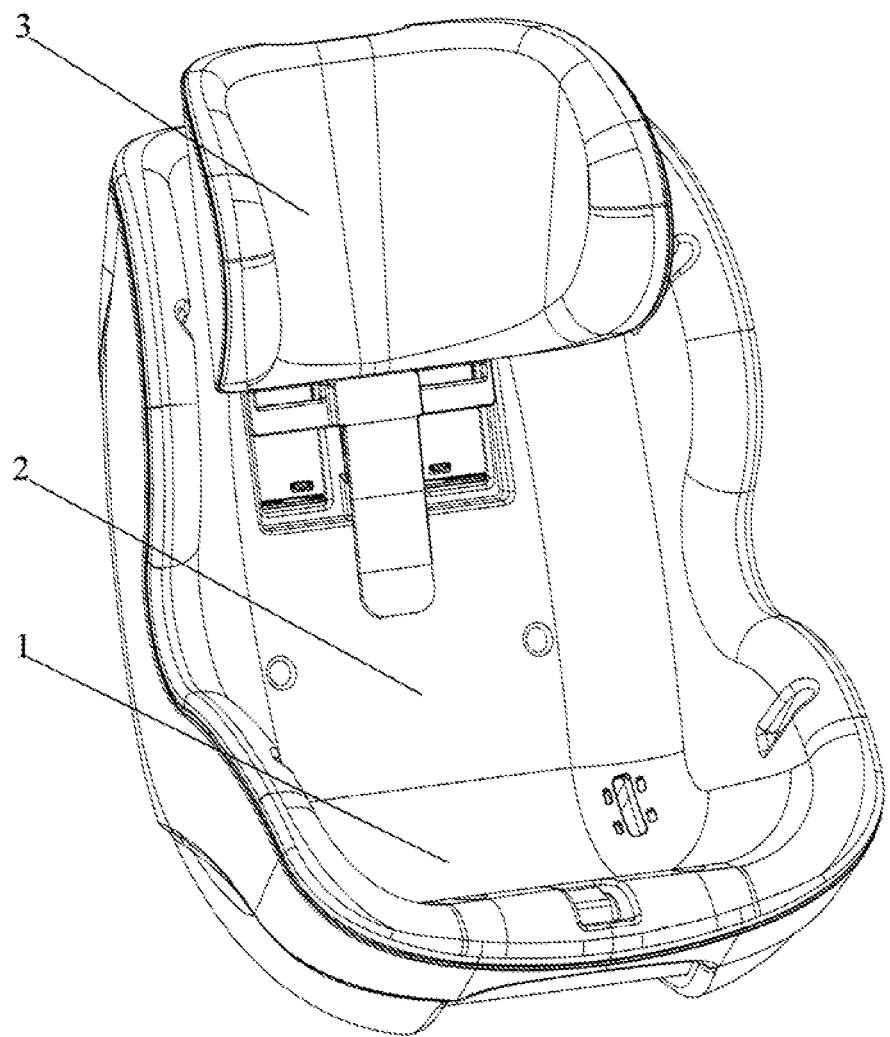
FIG. 1 is a schematic view illustrating an embodiment of a child safety seat.
Figure 2:
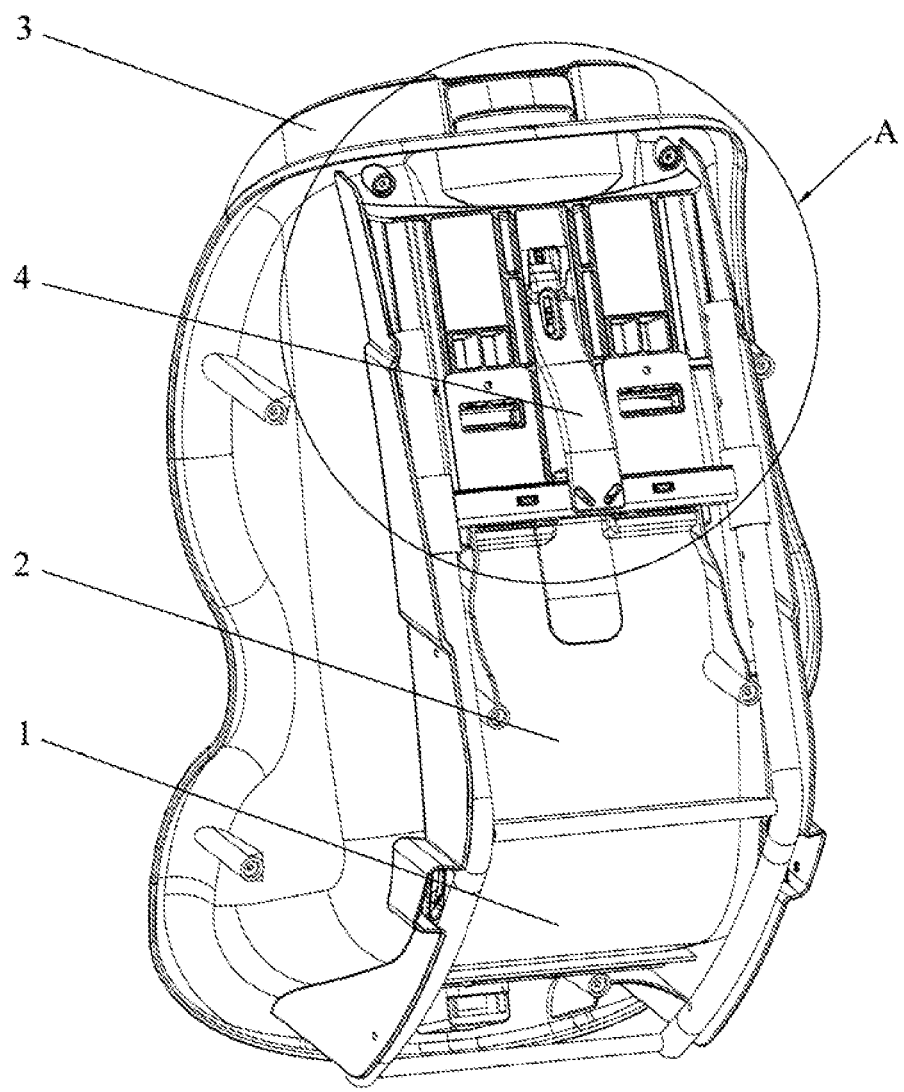
FIG. 2 is a schematic view illustrating the child safety seat under another perspective.
Figure 3:
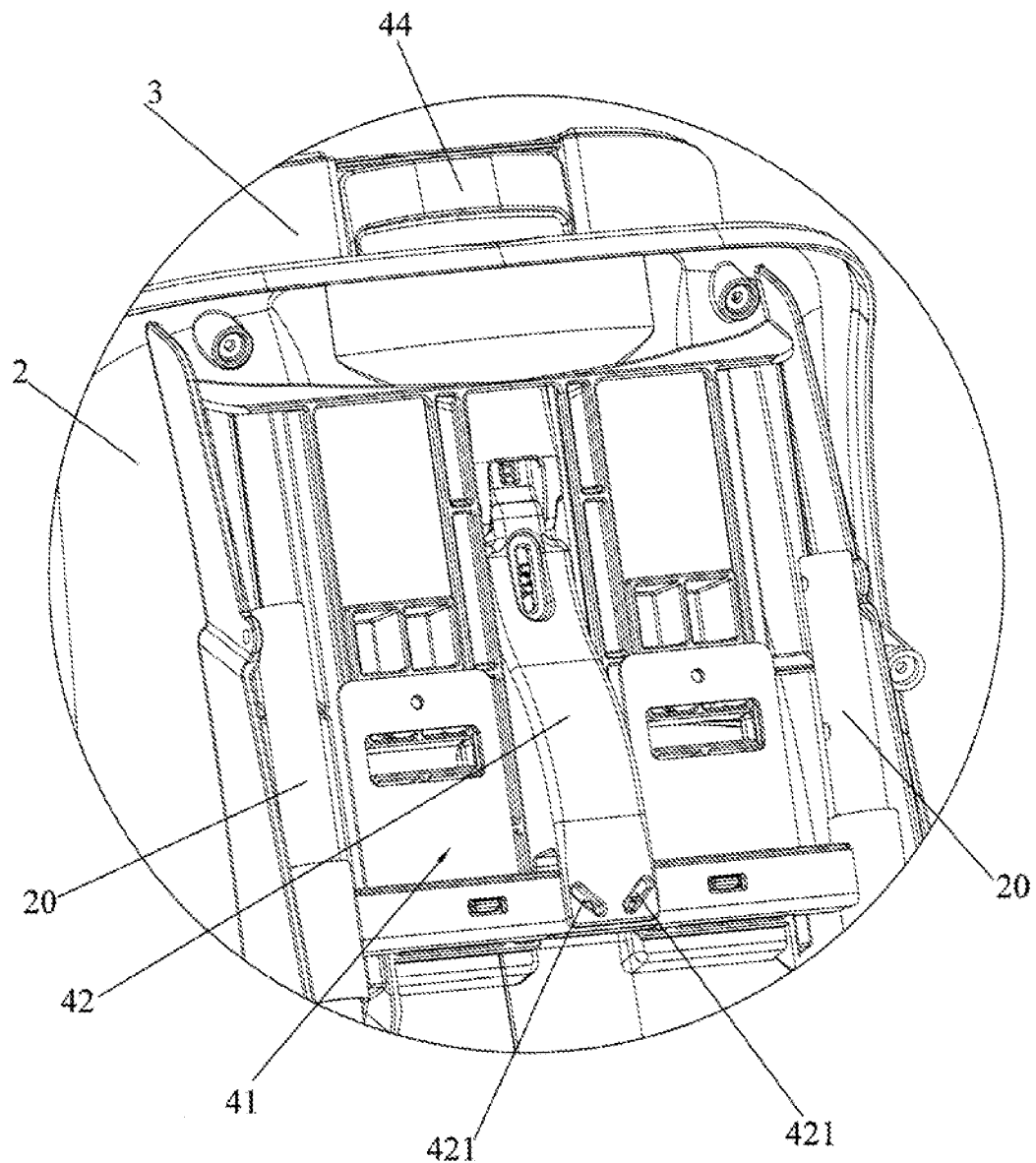
FIG. 3 is an enlarged view of portion A shown in FIG. 2.
Figure 4:
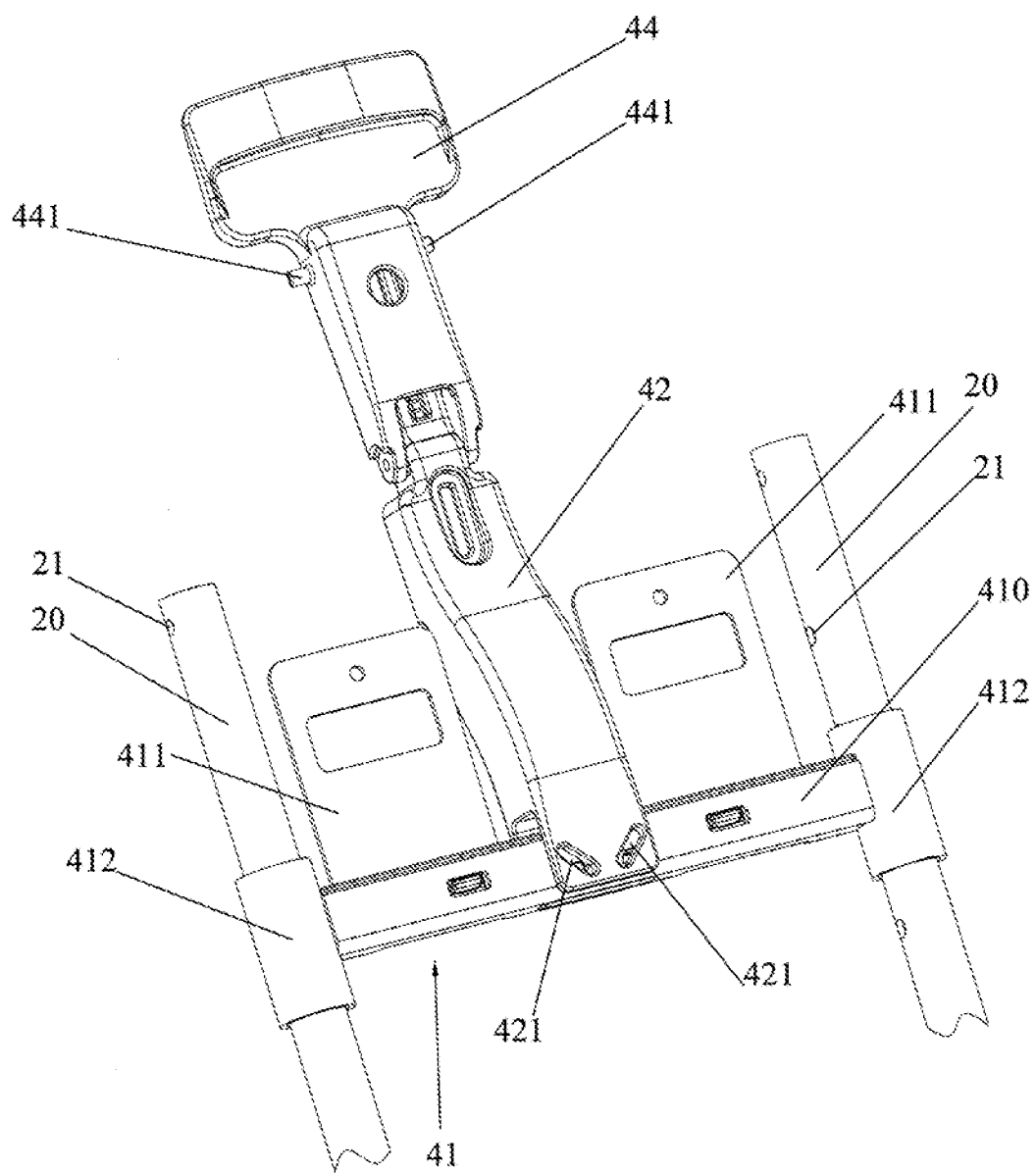
FIG. 4 is a schematic view illustrating a headrest adjustment mechanism implemented in the child safety seat.
Figure 5:
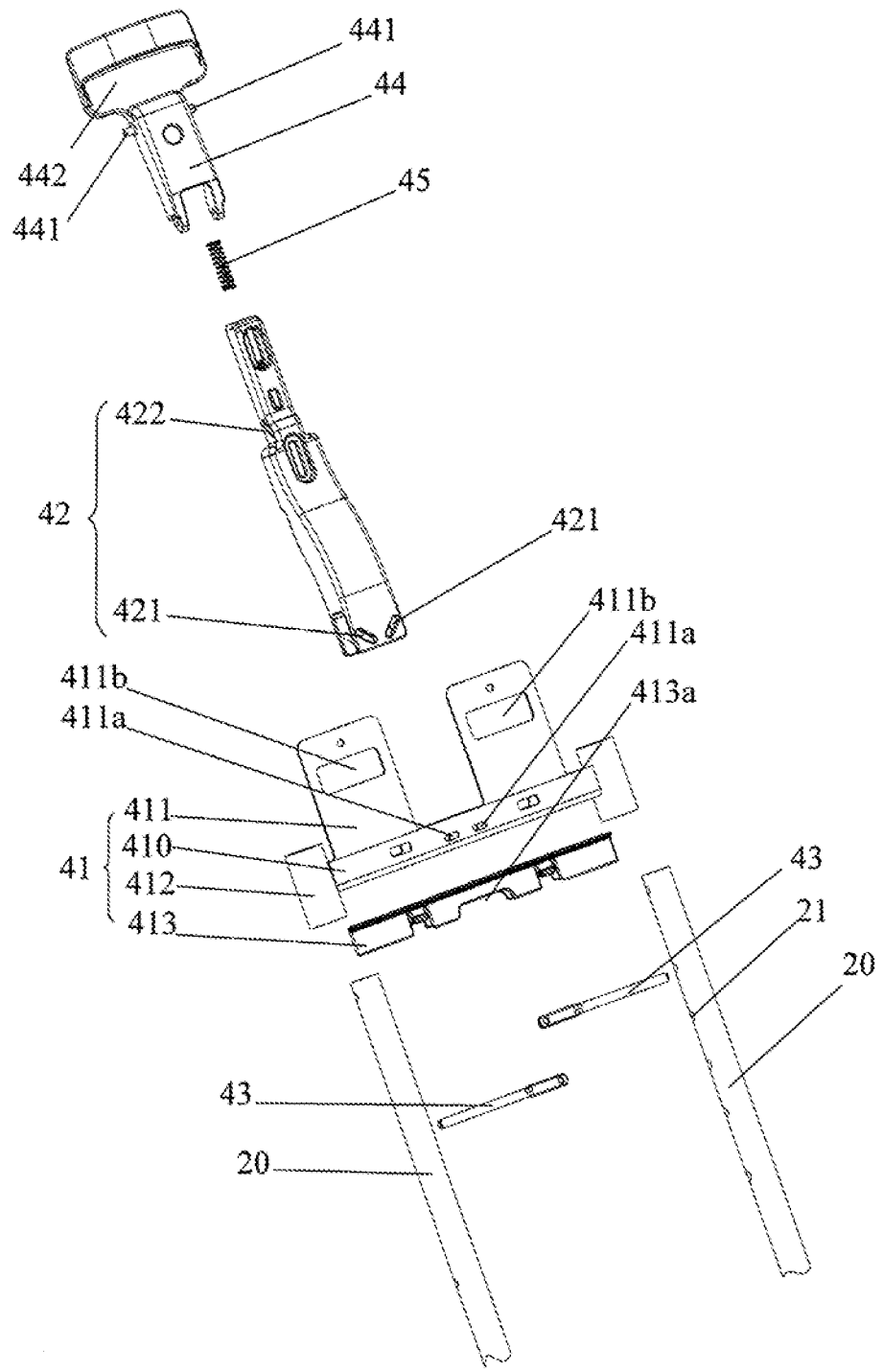
FIG. 5 is an exploded view of the headrest adjustment mechanism shown in FIG. 4.
Figure 6:
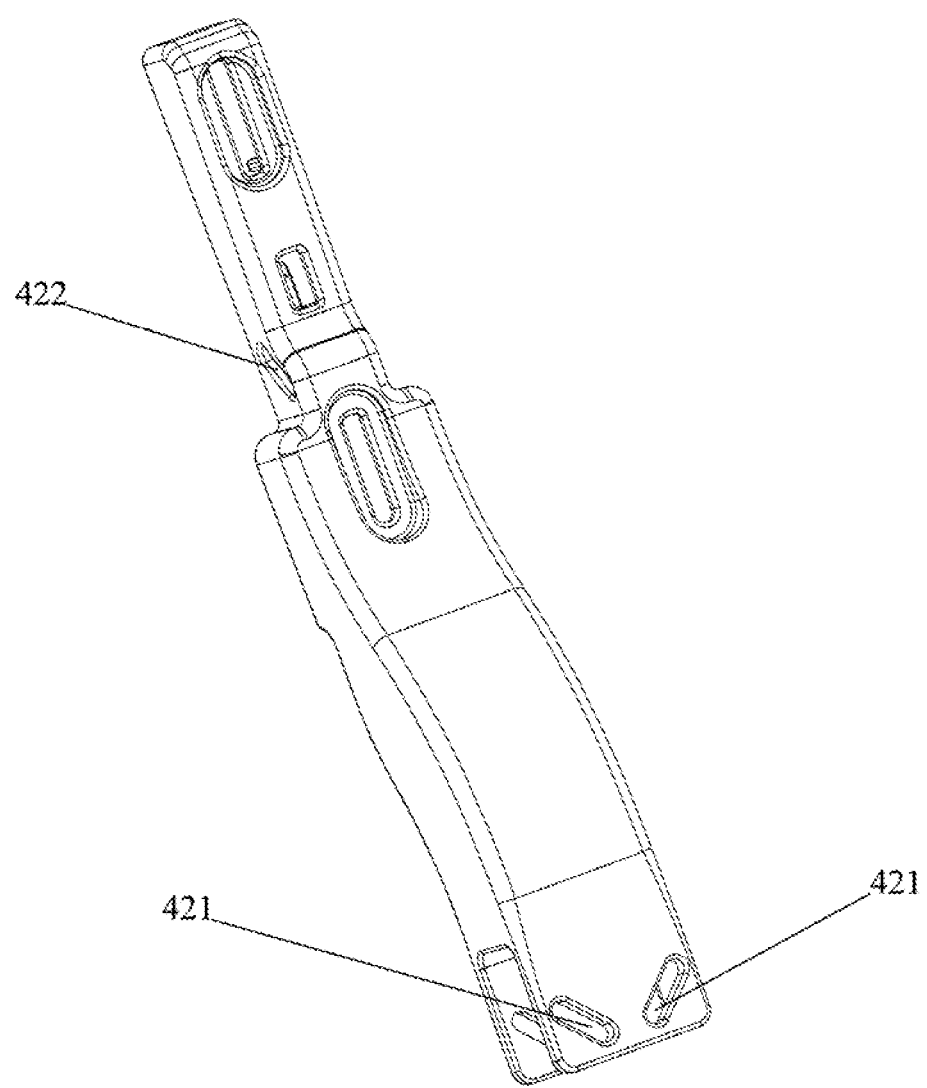
FIG. 6 is a schematic view illustrating a driving part used in the headrest adjustment mechanism.

FIGS. 1-5 are schematic views illustrating an embodiment of a child safety seat. The child safety seat can include a seat shell having a seat portion 1 and a backrest 2, and a headrest 3 assembled with the backrest 2 of the seat shell. The backrest 2 can be connected with the seat portion 1, and can have a lengthwise axis extending generally along an upright direction relative to the seat portion 1. The headrest 3 can be assembled with the backrest 2 at a front of the backrest 2 for providing support for the head of a child sitting on the seat portion 1. Moreover, the child safety seat can include a headrest adjustment mechanism 4 coupled with the headrest 3, and the headrest 3 can be movable up and down along the lengthwise axis of the backrest 2 for vertical adjustment.

The headrest adjustment mechanism 4 can include two tube segments 20, a mount frame 41, a driving part 42 and one or more latch 43 (two latches 43 are exemplary shown), a release actuator 44 and a spring 45. The two tube segments 20 can be affixed with the backrest 2 at two locations transversally spaced apart from each other, and can respectively extend along the lengthwise axis of the backrest 2. A plurality of locking openings 21 are also formed along each of the tube segments 20.

The mount frame 41 can be affixed with the headrest 3, and can be movably assembled with the tube segments 20. In one embodiment, the mount frame 41 can include a transversal segment 410 extending transversally between the two tube segments 20, two extensions 411 connected with the transversal segment 410 and transversally spaced apart from each other, and two sleeves 412 connected with two opposite ends of the transversal segment 410. The mount frame 41, including the transversal segment 410, the extensions 411 and the sleeves 412 may be formed as a unitary piece.

The transversal segment 410 of the mount frame 41 can extend between the two tube segments 20, and can have two elongated slots 411*a* spaced apart from each other. The extensions 411 can project upward from the transversal segment 410. The tube segments 20 can be respectively arranged through the sleeves 412, such that the mount frame 41 can be movable along the tube segments 20. The headrest 3 can be thereby movably assembled with the backrest 2.

The extensions 411 can respectfully include strap-routing slots 411*b* through which shoulder straps of the child safety seat can be routed from a rear to a front of the headrest 3. The backrest 2 can also include two vertical channels corresponding to the two strap-routing slots 411*b*. When the headrest 3 is adjusted up and down, the shoulder straps can also be adjustably raised and lowered.

A guiding member 413 having an elongated shape can also be fixedly disposed in the transversal segment of the mount frame 41 to facilitate the assembly and operation of the latches 43. The guiding member 413 can have a guide slot 413*a* that can limit transversal displacement of the latches 43.

The driving part 42 can be assembled at a rear of the headrest 3 centrally between the two tube segments 20, and be operable to move along the lengthwise axis of the backrest 2. In one embodiment, the driving part 42 can be formed as a single integral part having an elongated shape. The driving part 42 can have a lower portion provided with two guide slots 421 that are inclined symmetrically relative to the axis of displacement of the driving part 42. The two guide slots 421 are disposed respectively overlapping at least partially with the two elongated slots 411*a* of the mount frame 41, and extend at an angle relative to the elongated slots 411*a*.

The two latches 43 can be respectively assembled through an interior of the transversal segment 410 of the mount frame 41 near the tube segments 20. The latches 43 can move transversally to relative to the transversal segment 410 of the mount frame 41 and perpendicular to the axis of displacement of the driving part 42 to respectively engage with and disengage from the tube segments 20. Each of the latches 43 can have a first end portion provided with a protruding pin that is arranged for movement along one guide slot 421 of the driving part 42 and one elongated slot 411*a* of the mount frame 41 associated therewith. Owing to the inclination and overlap of the guide slot 421 relative to the elongated slot 411*a*, vertical displacement of the driving part 42 can thereby converted into a transversal displacement of the latches 43, and reciprocally. Each of the latches 43 can further include a second end portion that is located adjacent to the interior of corresponding one sleeve 412 and is adapted to engage with any of the locking openings 21 of one associated tube segment 20. Because the engaging portions of the latch 43 and the locking opening 21 are concealed inside the sleeve 412, external interference can be prevented and the locking engagement of the latch 43 with the tube segment 20 can be more reliable.

Figure 7:
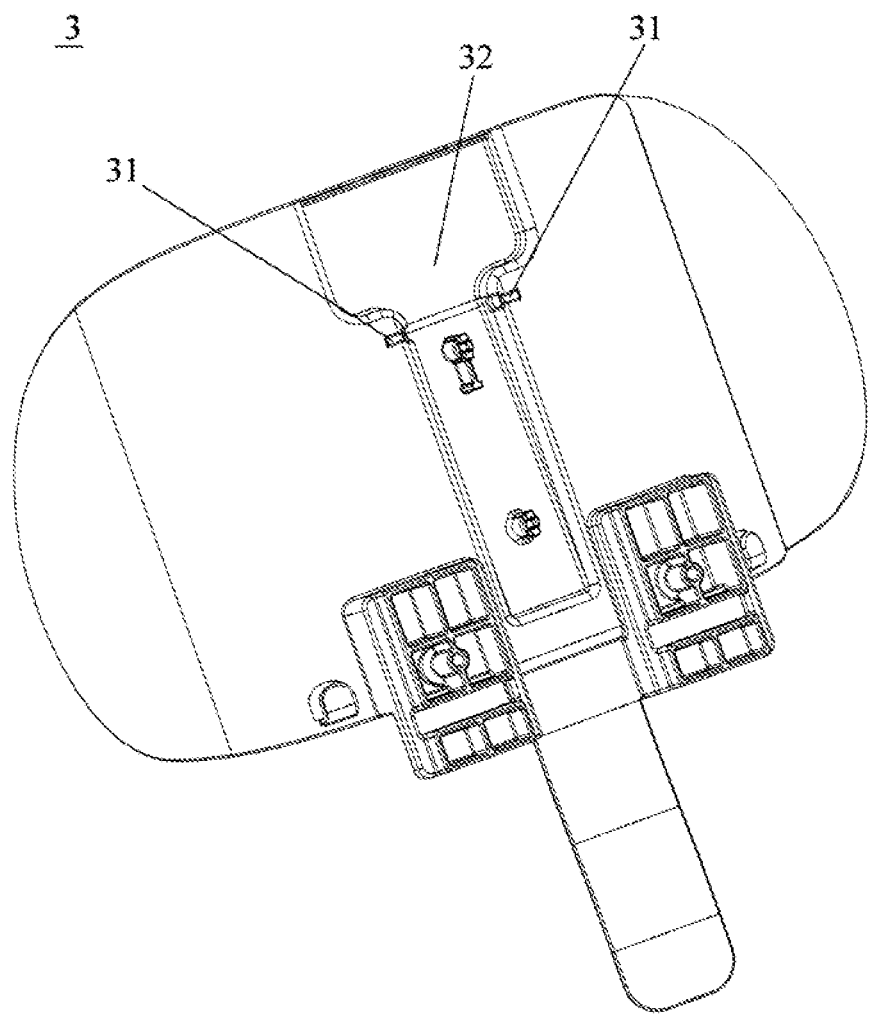
FIG. 7 is a schematic view illustrating the headrest of the child safety seat.
Figure 8:
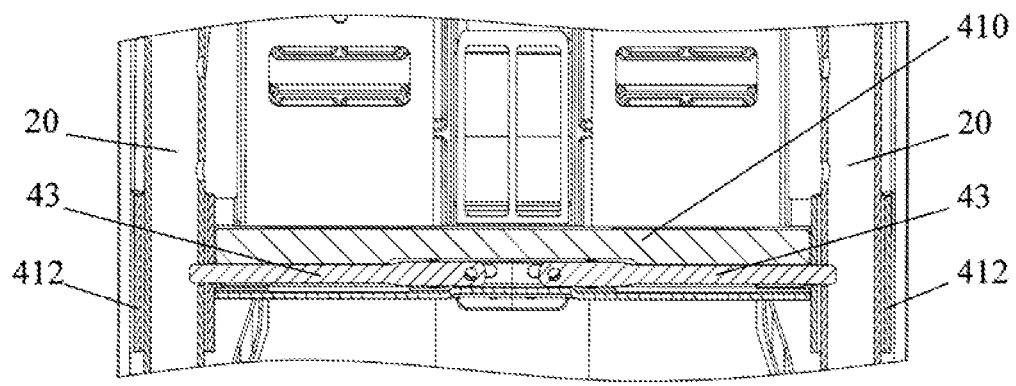
FIG. 8 is a schematic view illustrating the engagement of two latches with two tube segments in the headrest adjustment mechanism.
Figure 9:
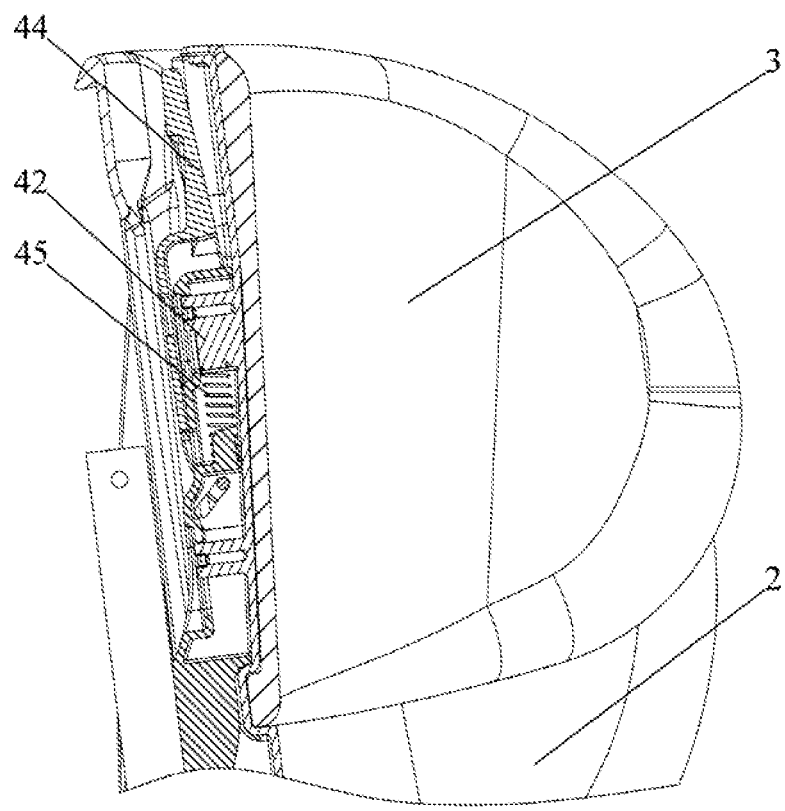
FIG. 9 is a schematic view illustrating the headrest adjustment mechanism in a locking state corresponding to the representation of FIG. 8.
Figure 10:
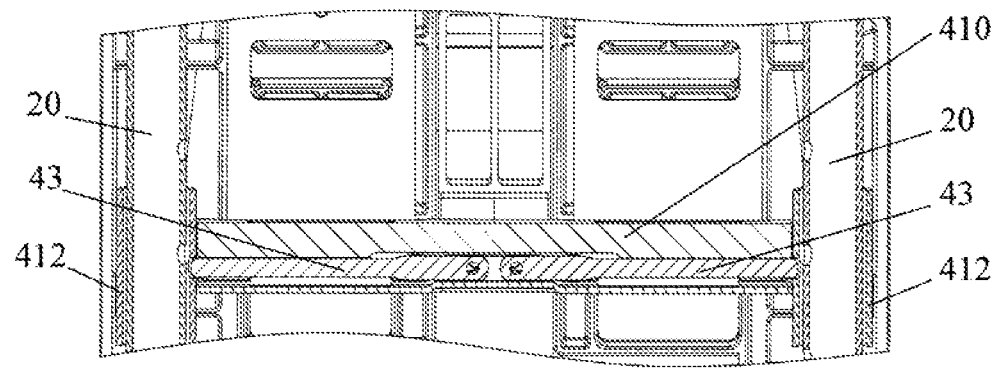
FIG. 10 is a schematic view illustrating the latches disengaged from the tube segments.
Figure 11:
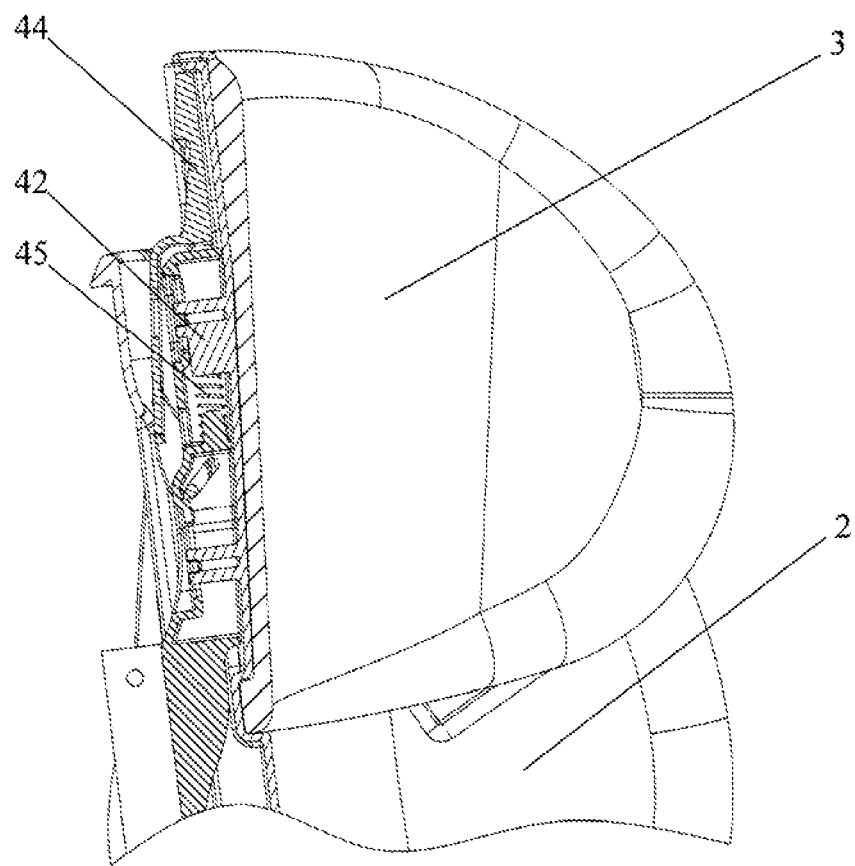
FIG. 11 is a schematic view illustrating the headrest adjustment mechanism in an unlocking state corresponding to the representation of FIG. 10.

The release actuator 44 can be pivotally connected with the headrest 3, and can be operable to drive displacement of the latches 43 via the driving part 42 to cause disengagement of the latches 43 from the tube segments 20. As better shown in FIG. 7, a rear surface of the headrest 3 can include a pocket 32 in which the release actuator 44 can be received. In one embodiment, the release actuator 44 can be formed as one single integral part that is assembled with the headrest 3 and is connected with the driving part 42. The release actuator 44 can include two protruding pin portions 441 that can be pivotally assembled with recesses 31 of the headrest 3, so that the release actuator 44 can be operable to rotate relative to the headrest 3. An upper portion of the release actuator 44 can include an operating portion 442 that lies adjacent to a top of the headrest 3 and is accessible from the rear of the headrest 3. A lower portion of the release actuator 44 can include a plurality of pins that can be respectively assembled through inclined slots 422 provided in an upper portion of the driving part 42. Accordingly, rotation of the release actuator 44 can drive vertical displacement of the driving part 42 along the lengthwise axis of the backrest 2 for disengaging the latches 43 from the tube segments 20.

The spring 45 can have two ends respectively anchored with the upper portion of the driving part 42 and the headrest 3. The spring 45 can apply a biasing force substantially parallel to the lengthwise axis of the backrest 2 so as to urge the driving part 42 to move in a downward direction for causing the latches 43 to engage with the tube segments 20.

Reference is made to FIGS. 7-10 hereinafter to describe the operation of the headrest adjustment mechanism 4. When the headrest 3 is locked in position, the upper end portion of the release actuator 44 is spaced apart from a rear surface of the headrest 3 (e.g., an inner surface of the pocket 32 facing the release actuator 44), and the latches 43 respectively extend into the sleeves 412 to engage with one set of corresponding locking openings 21 of the tube segments 20. The headrest 2 can be thereby locked at a given height relative to the backrest 2.

When the headrest 3 is to be adjusted in height, the release actuator 44 can be rotated about the axis of the pin portions 441 toward the rear surface of the headrest 3. As a result, the release actuator 44 can pull the driving part 42 to move upward due to the connection of the release actuator 44 through the inclined slots 422. Owing to the angle between the guide slots 421 of the driving part 42 and the elongated slots 411*a* of the mount frame 41, the driving part 42 in turn can drive the latches 43 to move transversally toward each other to retract toward the interior of the transversal segment 410 and disengage from the tube segments 20. The headrest 3 thereby unlocked can be displaced along the tube segments 20 until it reaches a desired height. While the headrest 3 is moved vertically relative to the backrest 2, the extensions 411 can also cause vertical adjustment of the shoulder straps to accommodate the size of the child.

Once the headrest 3 is placed at a desirable height, the release actuator 44 can be released. As a result, the spring 45 can urge the release actuator 44 to rotate reversely about the axis of the pin portions 441 away from the rear surface of the headrest 3, which in turn causes the driving part 42 to move downward and drive the latches 43 to move transversally in opposite directions and extend into the sleeves 412 for engaging with the tube segments 20 located therein.

At least one advantage of the child safety seat described herein includes the ability to provide a headrest adjustment mechanism that is simple in construction, easy to operate, and can reliably lock the headrest in position.

Realizations of the structures have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell including a backrest having a lengthwise axis;
   a headrest assembled with the seat shell and movable along the lengthwise axis of the backrest; and
   a headrest adjustment mechanism including:

two tube segments affixed with the backrest;
a mount frame affixed with the headrest, the mount frame being movable along the tube segments during adjustment of the headrest relative to the backrest;
two latches assembled with the mount frame, wherein the latches are operable to move transversally relative to the headrest to respectively engage with the two tube segments to lock the headrest in position, and to respectively disengage from the tube segments to allow adjustment of the headrest; and
a driving part connected with the two latches, the driving part having a lower portion provided with two guide slots that are inclined symmetrically relative to an axis of displacement of the driving part, and the two latches having portions that are respectively connected through the two guide slots, wherein the driving part is movable along the lengthwise axis to cause the latches to respectively disengage from the tube segments.

2. The child safety seat according to claim 1, wherein the latches are movable along a direction that is perpendicular to an axis of displacement of the driving part.

3. The child safety seat according to claim 1, wherein the driving part is disposed centrally between the two tube segments.

4. The child safety seat according to claim 1, wherein the driving part moves upward to drive the two latches in movement toward each other to disengage from the two tube segments.

5. The child safety seat according to claim 1, wherein the tube segments respectively include a plurality of locking openings, and the latches are operable to engage with any ones of the locking openings to lock the headrest at a desired position relative to the backrest.

6. A child safety seat comprising:
a seat shell including a backrest having a lengthwise axis;
a headrest assembled with the seat shell and movable along the lengthwise axis of the backrest; and
a headrest adjustment mechanism including:
two tube segments affixed with the backrest;
a mount frame affixed with the headrest, the mount frame being movable along the tube segments during adjustment of the headrest relative to the backrest;
two latches assembled with the mount frame, wherein the latches are operable to move transversally relative to the headrest to respectively engage with the two tube segments to lock the headrest in position, and to respectively disengage from the tube segments to allow adjustment of the headrest;
a driving part connected with the two latches, wherein the driving part is movable along the lengthwise axis to cause the latches to respectively disengage from the tube segments; and
a release actuator pivotally assembled with the headrest, the release actuator having a lower portion connected with the driving part, such that a rotation of the release actuator causes displacement of the driving part along the lengthwise axis.

7. The child safety seat according to claim 6, wherein the headrest includes a pocket in which the release actuator is received.

8. The child safety seat according to claim 6, wherein the release actuator is formed as one single part that is connected with the driving part.

9. The child safety seat according to claim 6, wherein the release actuator has a lower portion assembled with a plurality of slots provided in an upper portion of the driving part.

10. The child safety seat according to claim 1, wherein the headrest adjustment mechanism further includes a spring having two ends respectively anchored with the driving part and the headrest, the spring being operable to create a biasing force to urge the driving part to move in a direction for causing the latches to respectively engage with the tube segments.

11. The child safety seat according to claim 1, wherein the mount frame includes two sleeves through which the tube segments are disposed, the sleeves being movable along the tube segments.

12. The child safety seat according to claim 1, wherein the mount frame further includes two strap-routing slots through which shoulder straps of the child safety seat are routed.

13. The child safety seat according to claim 11, wherein the two latches are movable to respectively extend into the two sleeves to engage with the two tube segments.

14. A child safety seat comprising:
a seat shell including a backrest having a lengthwise axis;
a headrest assembled with the seat shell and movable along the lengthwise axis of the backrest; and
a headrest adjustment mechanism including:
two tube segments affixed with the backrest;
a mount frame affixed with the headrest, the mount frame being movable along the tube segments during adjustment of the headrest relative to the backrest;
two latches assembled with the mount frame, wherein the latches are operable to move transversally relative to the headrest to respectively engage with the two tube segments to lock the headrest in position, and to respectively disengage from the tube segments to allow adjustment of the headrest; and
a driving part connected with the two latches, wherein the driving part is movable along the lengthwise axis to cause the latches to respectively disengage from the tube segments;
wherein the mount frame includes a transversal segment having two elongated slots, the driving part includes two guide slots that respectively overlap at least partially with the elongated slots and respectively extend at an angle relative to the elongated slots, and the two latches are assembled in the transversal segment and are respectively connected with the elongated slots of the transversal segment and the guide slots of the driving part.

* * * * *